(12) United States Patent
Maeda et al.

(10) Patent No.: US 9,014,542 B2
(45) Date of Patent: Apr. 21, 2015

(54) VIDEO RECORD/PLAYBACK APPARATUS AND CONTROL METHOD FOR SAME

(75) Inventors: Masamine Maeda, Chiba (JP); Atsuhiro Murata, Kirishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1238 days.

(21) Appl. No.: 12/101,559

(22) Filed: Apr. 11, 2008

(65) Prior Publication Data
US 2008/0260348 A1    Oct. 23, 2008

(30) Foreign Application Priority Data

Apr. 23, 2007    (JP) ................................ 2007-113162

(51) Int. Cl.
*H04N 5/76*    (2006.01)
*G11B 27/034*    (2006.01)
*G11B 27/10*    (2006.01)

(52) U.S. Cl.
CPC ................ *G11B 27/034* (2013.01); *H04N 5/76* (2013.01); *G11B 27/105* (2013.01)

(58) Field of Classification Search
CPC ........... H04N 5/76; H04N 5/781; G11B 27/36
USPC .................................... 386/52, 239, 279, 282
See application file for complete search history.

(56) References Cited

U.S. PATENT DOCUMENTS

| | | | |
|---|---|---|---|
| 6,222,807 B1 * | 4/2001 | Min-Jae | 369/47.12 |
| 6,353,700 B1 * | 3/2002 | Zhou | 386/353 |
| 7,114,048 B2 | 9/2006 | Iwatsu et al. | |
| 2001/0007544 A1 * | 7/2001 | Fujisawa et al. | 369/47.12 |
| 2002/0037159 A1 * | 3/2002 | Goto et al. | 386/69 |
| 2005/0019003 A1 * | 1/2005 | Takeda | 386/52 |
| 2005/0271359 A1 * | 12/2005 | Nakai | 386/52 |
| 2006/0085491 A1 * | 4/2006 | Foote et al. | 707/202 |
| 2006/0098952 A1 * | 5/2006 | Fujimoto et al. | 386/111 |
| 2007/0005638 A1 * | 1/2007 | Park | 707/102 |
| 2007/0070828 A1 * | 3/2007 | Watanabe et al. | 369/30.19 |
| 2007/0223872 A1 * | 9/2007 | Huang et al. | 386/52 |
| 2008/0019660 A1 * | 1/2008 | Matsumoto | 386/46 |
| 2008/0228848 A1 * | 9/2008 | Takahashi | 709/201 |

FOREIGN PATENT DOCUMENTS

| | | |
|---|---|---|
| CN | 1476563 A | 2/2004 |
| CN | 1860542 A | 11/2006 |

(Continued)

OTHER PUBLICATIONS

May 25, 2010 Chinese Office Action that issued in Chinese Patent Application No. 200810093245.8.

*Primary Examiner* — Syed Zaidi
(74) *Attorney, Agent, or Firm* — Cowan, Liebowitz & Latman, P.C.

(57) ABSTRACT

In a video record/playback apparatus, interrupting a dubbing process that records video data recorded on one recording medium onto another recording medium in a case in which there is a request during the dubbing process to execute a priority process of higher priority than a dubbing process. In addition, at this time, interrupted dubbing information needed to resume the dubbing process is stored. After the dubbing process is interrupted, the user is asked whether or not to resume the dubbing process, and, in a case in which there is an instruction from the user to resume the dubbing process, resuming the dubbing process using the interrupted dubbing information.

11 Claims, 13 Drawing Sheets

(56) References Cited

FOREIGN PATENT DOCUMENTS

| JP | 02-004295 A | 1/1990 |
| JP | 2000-195232 | 7/2000 |
| JP | 2004-241935 A | 8/2004 |
| JP | 2004-260701 A | 9/2004 |
| JP | 2006-202357 A | 8/2006 |
| WO | 2005-067291 A1 | 7/2005 |
| WO | 2005/093745 A | 10/2005 |

* cited by examiner

F I G. 4
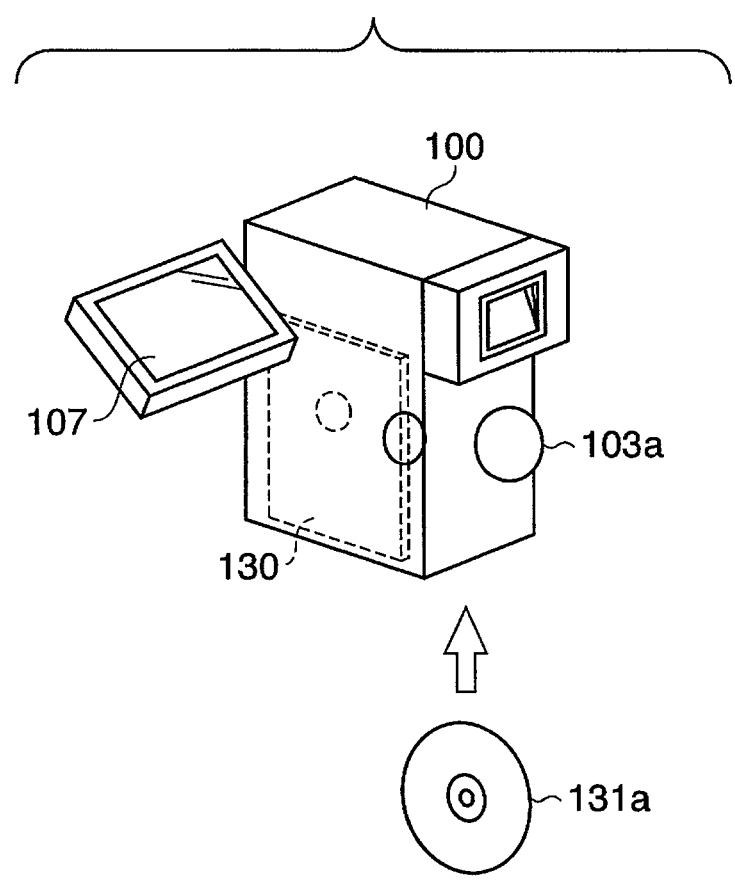

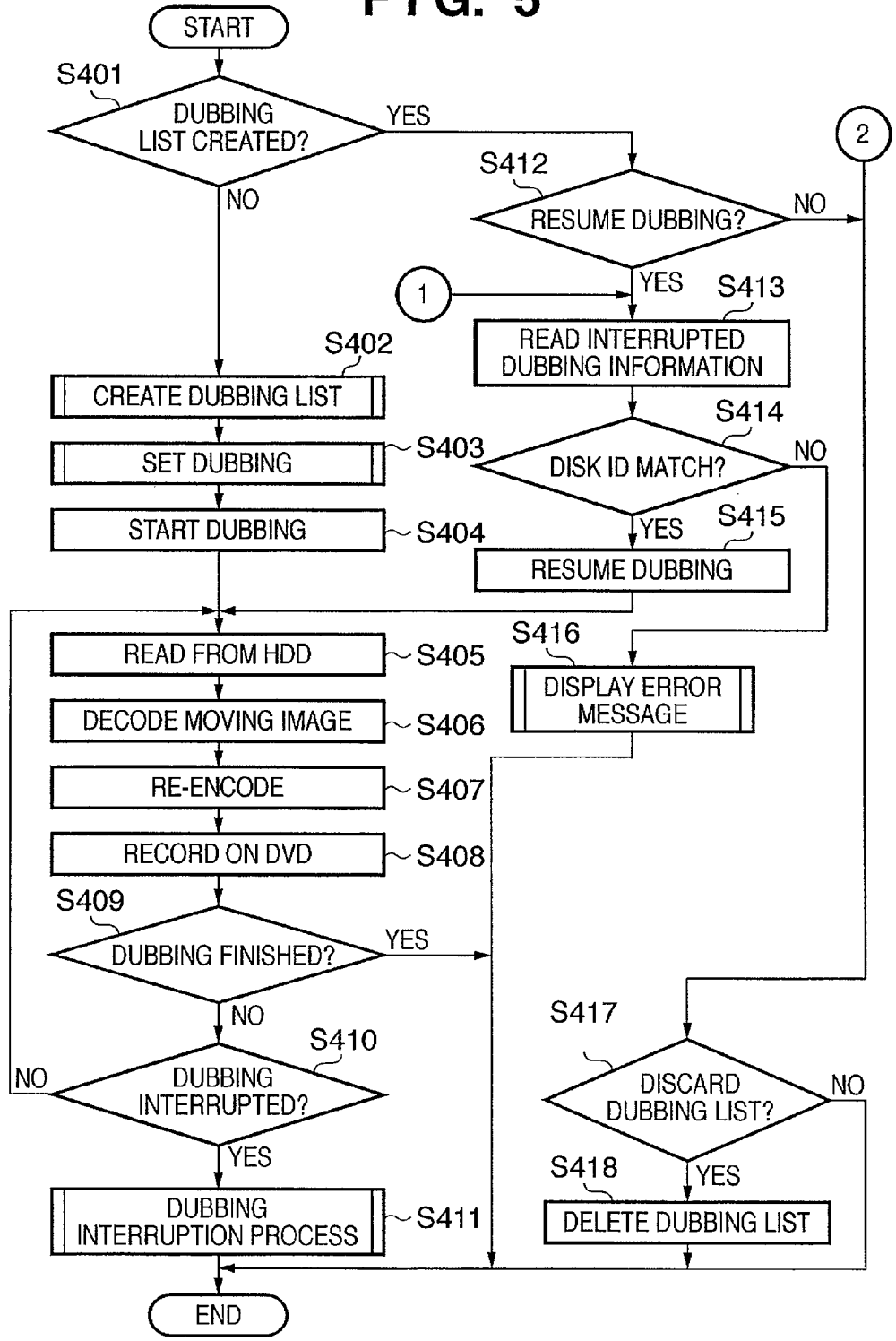

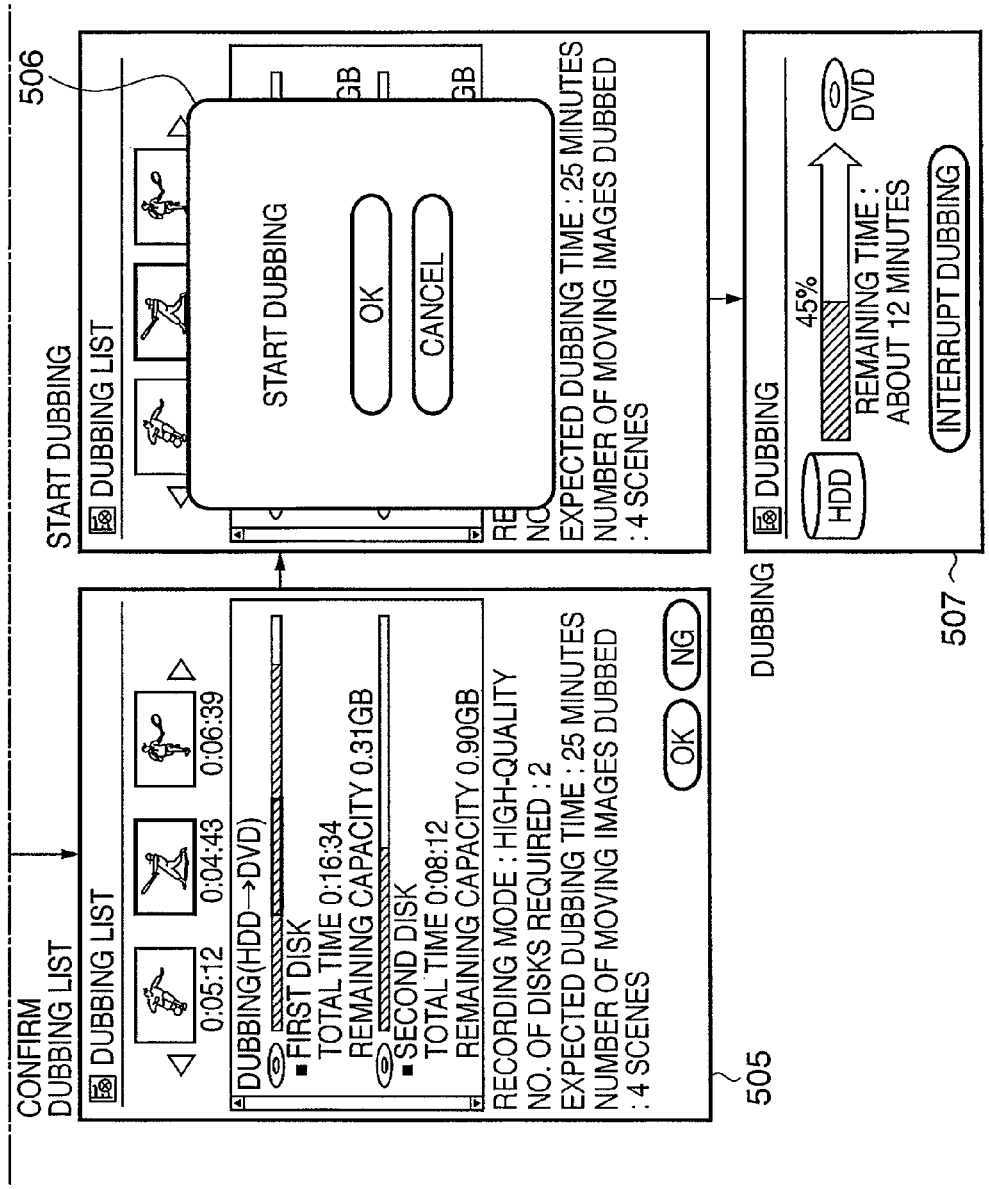

F I G. 10
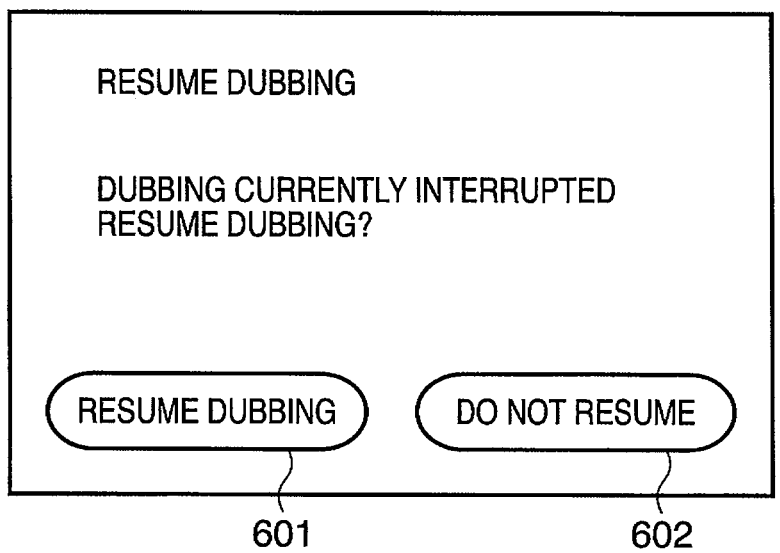

VIDEO RECORD/PLAYBACK APPARATUS AND CONTROL METHOD FOR SAME

BACKGROUND OF THE INVENTION

1. Field of the Invention

The present invention relates to a video record/playback apparatus and a control method for same, and more particularly, to a video record/playback apparatus capable of a dubbing process between a plurality of recording media, and a control method for the video record/playback apparatus.

2. Description of the Related Art

Among digital video cameras of recent years, there are those that use a nonvolatile memory card or a hard disk drive as a recording medium. These types of recording media, because they are random-accessible media, can provide better usability with respect to recording and playback than can digital video cameras using magnetic tape.

As recording densities of recording media have increased and recording media prices have come down, random access recording media have also come to have comparatively large capacities. However, there is a limit to such capacity, and when there is no more remaining recording capacity it is necessary to delete recorded video data to secure capacity. In a case in which one wishes to retain video data, it is necessary to transfer the recorded video to an external device such as a personal computer or a DVD recorder and create a backup copy that records on a separate medium for keeping.

Moreover, recently, digital video cameras have begun to appear that, in addition to a built-in hard disk drive as a storage device, also have a recording device (for example, a DVD (Digital Versatile Disc) drive) to record to removable media. This type of digital video camera has a function for dubbing video recorded on the hard disk drive to the removable media.

However, because during dubbing the digital video camera enters a state in which it can accept no manipulations, including turning the power OFF, it is, for example, not possible to sense images during dubbing even if one wishes to do so. In addition, because the recording speed of a recording device using a removable medium is not that fast, extended video dubbing takes time.

In order to handle these problems, in Japanese Patent Laid-Open No. 2000-195232 a technology is proposed that, in a record/playback apparatus having a function for dubbing contents of a CD onto a sequential access recording medium such as magnetic tape, allows the dubbing operation to be interrupted and subsequently resumed.

However, the record/playback apparatus described in Japanese Patent Laid-Open No. 2000-195232 does not carry out other operations such as new recording during dubbing interruption. As a result, there is no description at all of the relation to other operations in a case in which dubbing is interrupted for another operation or when the dubbing operation is resumed.

There has been no specific study of how, for example, in a digital video camera capable of using a plurality of recording media, during a dubbing process of dubbing from one recording medium to another recording medium, operational control is to be carried out in a case in which an image sensing instruction has been given.

SUMMARY OF THE INVENTION

The present invention is conceived in light of the problems of the conventional art described above.

In one aspect, the present invention makes it possible to interrupt and subsequently resume a dubbing process in order to execute another operation in a video record/playback apparatus capable of dubbing video data between multiple recording media.

In another aspect, the present invention provides a video record/playback apparatus capable of recording new video even during the dubbing process.

According to an aspect of the present invention, there is provided a video record/playback apparatus capable of a dubbing process that records video data recorded on a first recording medium to a second recording medium, comprising: interrupting unit adapted to interrupt the dubbing process as well as store interrupted dubbing information necessary to resume the dubbing process in a case in which there is a request during the dubbing process to execute a priority process of higher priority than the dubbing process; asking unit adapted to ask a user whether or not to resume the dubbing process after the dubbing process is interrupted; and resuming unit adapted to resume the dubbing process using the interrupted dubbing information in a case in which there is an instruction to resume the dubbing process from the user.

According to another aspect of the present invention, there is provided a control method for a video record/playback apparatus capable of a dubbing process that records video data recorded on a first recording medium to a second recording medium, the control method comprising: a step of interrupting the dubbing process as well as storing interrupted dubbing information necessary to resume the dubbing process in a case in which there is a request during the dubbing process to execute a priority process of higher priority than the dubbing process; a display step of displaying on a display device a screen for asking a user whether or not to resume the dubbing process after the dubbing process is interrupted; and a step of resuming the dubbing process using the interrupted dubbing information in a case in which there is an instruction to resume the dubbing process from the user via the screen.

According to further aspect of the present invention, there is provided a video record/playback apparatus comprising: recording unit adapted to record on and playing back video data from a first recording medium and a second recording medium; executing unit adapted to execute a dubbing process that records video data recorded on the first recording medium to the second recording medium; stopping unit adapted to stop the dubbing process in a case in which a request is made during the dubbing process to record video data to either the first recording medium or the second recording medium and generate interrupted dubbing information relating to video data to be recorded on the second recording medium by the dubbing process; asking unit adapted to ask a user whether or not to resume the dubbing process after the dubbing process is stopped; and resuming unit adapted to resume the stopped dubbing process using the interrupted dubbing information in a case in which there is an instruction to resume the dubbing process in response to the asking.

According to yet further aspect of the present invention, there is provided a control method for a video record/playback apparatus having recording means for recording on and playing back video data from a first recording medium and a second recording medium, the control method comprising: a step of executing a dubbing process that records video data recorded on the first recording medium to the second recording medium; a step of stopping the dubbing process in a case in which a request is made during the dubbing process to record video data to either the first recording medium or the second recording medium and generating interrupted dubbing information relating to video data to be recorded on the second recording medium by the dubbing process for storage in a storage means; a step of asking a user whether or not to resume the dubbing process after the dubbing process is stopped; and a step of resuming the stopped dubbing process using the interrupted dubbing information in a case in which there is an instruction to resume the dubbing process in response to the asking.

Further features of the present invention will become apparent from the following description of exemplary embodiments with reference to the attached drawings.

BRIEF DESCRIPTION OF THE DRAWINGS

FIG. 4 is a diagram showing an example external view of the digital video camera according to embodiments of the present invention;

FIG. 5 is a flow chart illustrating operation of a dubbing process in the digital video camera according to embodiments of the present invention;

FIGS. 6A and 6B are diagrams illustrating operation of a dubbing list creation process in the digital video camera according to embodiments of the present invention;

FIG. 10 is a diagram showing an example of a screen that the digital video camera according to embodiments of the present invention displays in order to ask the user whether or not to resume the dubbing process;

DESCRIPTION OF THE EMBODIMENTS

Preferred embodiments of the present invention will now be described in detail according to the accompanying drawings.

Figure 1:
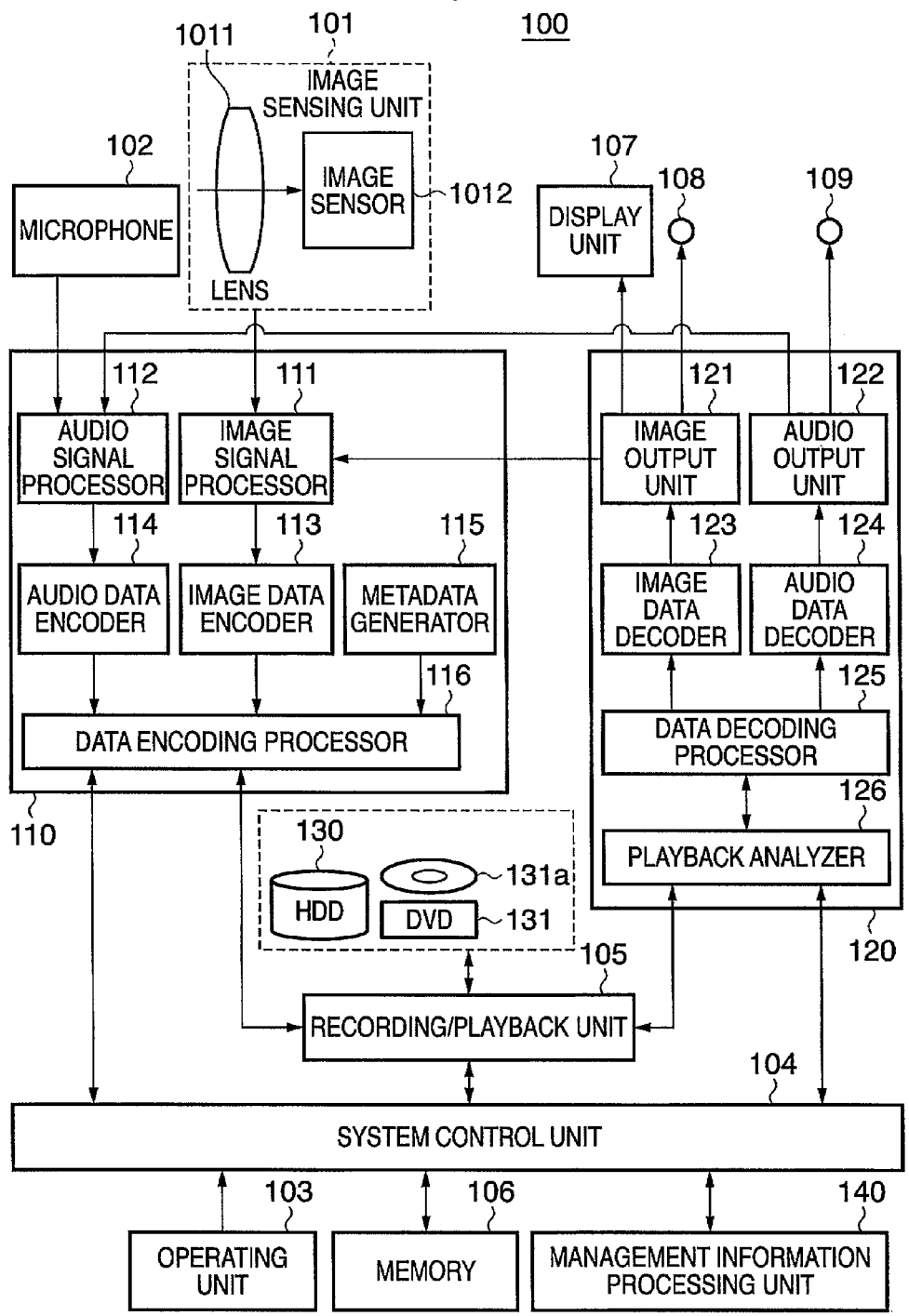
FIG. 1 is a block diagram showing an example functional configuration of a digital video camera as one example of a video record/playback apparatus according to embodiments of the present invention.

FIG. 1 is a block diagram showing an example functional configuration of a digital video camera as one example of a video record/playback apparatus according to embodiments of the present invention.

A digital video camera 100 of the present invention is capable of using both a hard disk drive (HDD) as an example of a first recording medium and a DVD (Digital Versatile Disc) as an example of a second recording medium. Although in the present embodiment the second recording medium is removable media, alternatively it may be fixed media.

As shown in FIG. 1, the digital video camera 100 has an image sensing unit 101, a microphone 102, an operating unit 103, a system control unit 104, a recording/playback unit 105, a memory 106, and a display unit 107. The digital video camera 100 further has a video output terminal 108, an audio output terminal 109, a recording circuits unit 110, a playback circuits unit 120, an HDD 130, a DVD drive 131, and a management information processing unit 140.

The image sensing unit 101 is composed of a lens unit 1011, an image sensor 1012, and the like. The lens unit 1011 is composed of a fixed lens, a zoom lens, an aperture, an auto focus mechanism, and the like, and collects reflected light from a subject and focuses an optical image of the subject on the image sensor 1012. The image sensor 1012 is a photoelectric conversion device such as a MOS image sensor, and converts the focused subject image into image signals that it then outputs to the image sensing unit 101.

The operating unit 103 contains switches, keys, and other such input devices for a user to provide various instructions to the digital video camera. A power switch, a recording start switch, a playback switch, a stop switch and the like are included in the operating unit 103.

The recording circuits unit 110 is composed of an image signal processor 111, an audio signal processor 112, an image data encoder 113, an audio data encoder 114, a metadata generator 115, and a data encoding processor 116. The playback circuits unit 120 is composed of an image output unit 121, an audio output unit 122, an image data decoder 123, an audio data decoder 124, a data decoding processor 125, and a playback analyzer 126.

By manipulating a menu screen or the like from the operating unit 103, the user selects either the HDD 130 or the DVD drive 131 as the recording destination or as the playback source. In addition, when the digital video camera 100 is in an idle state, that is, carrying out neither image sensing nor playback, the user can switch settings for recording designation and playback source at any time. In the present embodiment, the HDD 130 is built into the body of the digital video camera 100, and DVD media 131a can be freely installed in and detached from the digital video camera 100 by a mechanism that is not shown in the figures.

(Recording Operation)

Next, a description is given of a recording (image sensing) operation in the digital video camera 100 shown in FIG. 1.

In a state in which the recording mode is set by the operating unit 103, when the recording start switch on the operating unit 103 is depressed, the system control unit 104 activates the recording circuits unit 110 and starts a recording process.

The system control unit 104 implements various processes by, for example, executing a control program by a CPU, not shown, and controlling the units. The memory 106 is used as a work area when the system control unit 104 controls the digital video camera 100.

Image signals obtained by the image sensing unit 101 are supplied to the image signal processor 111 of the recording circuits unit 110. The image signal processor 111, after A/D converting the video signal thus received from the image sensing unit 101 into image data, carries out such processes as white balance and color interpolation on the image data, and outputs the processed results as image data to the image data encoder 113. At this time, the image signal processor 111 as necessary also carries out such processes as sub-sampling.

The image data encoder 113 encodes the image data from the image signal processor 111 according to such standards as MPEG2 or MPEG4, JPEG or the like, and outputs the encoded image data to the data encoding processor 116. Alternatively, the image data encoder 113 generates a thumbnail image showing a representative image of a single data file that it then outputs to the data encoding processor 116.

At the same time, audio data from the microphone 102 is output to the audio signal processor 112. The audio signal processor 112 converts the audio signal from the microphone 102 into digital data, and further, subjects the digitized audio data to noise suppression, amplification, and other such processes, and outputs it to the audio data encoder 114. The audio data encoder 114 encodes the audio data from the audio signal processor 112 according to such standards as MPEG2 or MPEG4 or the like and outputs it to the data encoding processor 116.

The data encoding processor 116 converts the encoded image data and audio data into a file format according to such standards as MPEG2 or MPEG4, JPEG or the like, and outputs the encoded image data to the recording/playback unit 105.

The metadata generator 115 generates data (metadata) indicating image sensing information, such as date and time of image sensing and aperture value, shutter speed, white balance, and so forth, and outputs same to the data encoding processor 116. It is to be noted that, in the present embodiment, the system control unit 104, using a known method, controls the aperture value and shutter speed in the image sensing unit 101. The system control unit 104 outputs this aperture value and shutter speed information to the metadata generator 115. In addition, the system control unit 104 has a built-in timer for counting the current date and time, and outputs the current date and time information to the metadata generator 115. The metadata generator 115 generates metadata based on this information.

The data encoding processor 116 puts this metadata and the thumbnail image from the image data encoder 113 in the file header or footer of the image data and the audio data and outputs it to the recording/playback unit 105. In addition, a file name and the like are also recorded in the header.

The management information processing unit 140, either during moving image recording or before and after moving image recording, continuously acquires from the recording circuits unit 110 the information required to generate management information according to standards and creates management information for managing and controlling recorded video. In addition to interrupted dubbing information to be described later, the management information contains, for example, such information as disk ID; total number of pieces of video data; playback time; playback time map; management number; video and audio compression encoding format; and text.

The recording/playback unit 105 records the data output from the recording circuits unit 110 and the management information from the management information processing unit 140 to a specified one of the HDD 130 or the DVD drive 131 (the DVD media 131a). The recording/playback unit 105 contains a file system for managing the writing of data to, and the reading of data from, the HDD 130 and the DVD media 131a.

The management information is also held in the memory 106 as necessary.

(Playback Operation)

Next, a description is given of a playback operation in the digital video camera 100 shown in FIG. 1.

The digital video camera of the present embodiment carries out playback in either an original playback mode, in which the video data is played back in the order in which it was recorded, or a play list playback mode, in which the video data is played back according to a play list that the user creates.

A play list is a list in which the user sets the scenes to be played back to any scenes and the order in which they are to be played back to any order. It is to be noted that, in the present embodiment, a "scene" means part or all of the video data, and therefore, a single piece of video data is composed of one or more scenes. A thumbnail image that is a representative image is associated with each scene. In a case in which a single piece of video data is composed of a plurality of scenes, multiple thumbnail images are stored in the header of the video data together with corresponding time information (for example, starting time, continuation time). The digital video camera of the present embodiment is one capable of enabling specification of playback and dubbing processes in units of "scenes".

In the present embodiment, a single set of moving image data recorded from the time the user instructs the start of recording to the time the user instructs the end of recording is managed as a single file, and this single file is treated as a single scene.

The play list is management information for carrying out scene playback control. As a result, even if the play list is deleted or edited (divided or joined), there is no effect whatsoever on the video data.

The user can switch the playback mode freely by manipulating the operating unit 103. It is to be noted that matters may be arranged so as to handle other playback modes besides the original playback mode and the play list playback mode. For example, it is possible to handle a mode that plays back scenes that match certain conditions, such as date-specific playback or event-specific playback.

When a playback mode (for example, the original playback mode) is set by the operating unit 103, the system control unit 104 acquires management information from the memory 106, for example.

Then, the system control unit 104 controls the playback circuits unit 120 based on the acquired management information and displays on the display unit 107 a list of thumbnail images of the video data recorded on the HDD 130 or the DVD media 131a. As described above, the thumbnail images are recorded in the video data file header.

Figure 2:
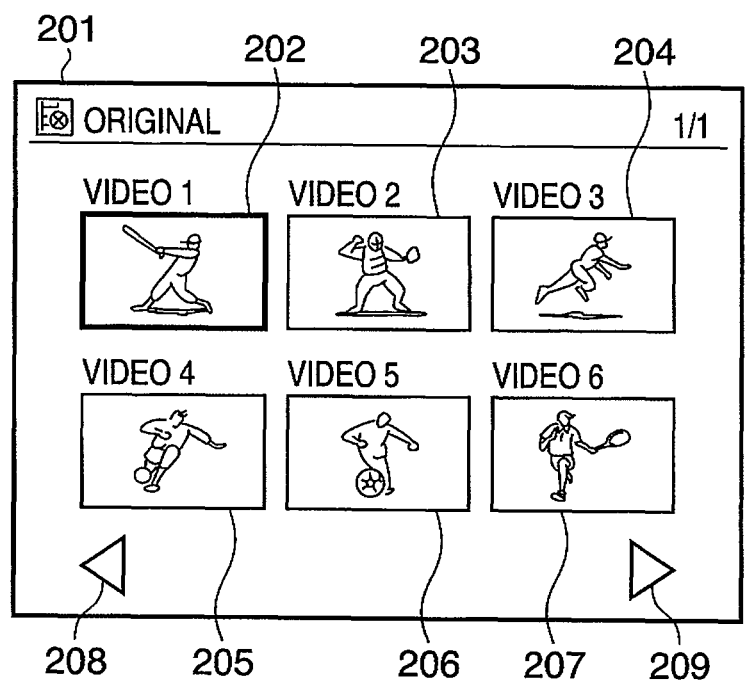
FIG. 2 is a diagram showing an example of a list display screen (index display screen) that the digital video camera according to embodiments of the present invention displays in an original playback mode.

FIG. 2 is a diagram showing an example of a list display screen (index display screen) in the original playback mode.

Thumbnail images 202-207 corresponding to scenes of the video data recorded on the HDD 130 or the DVD media 131a are displayed in an index display screen 201. The thumbnail images 202-207 are displayed according to the order of recording of the video data. The user manipulates the operating unit 103 and selects any thumbnail image, for example by pressing a set button or the like, and the specified thumbnail image can be reported. In the event that all the thumbnail images cannot be shown on one screen, display is carried out across multiple screens. By manipulating screen movement buttons 208, 209, the user can switch between a plurality of screens and display.

The system control unit 104 starts playback from the scene corresponding to the specified thumbnail image and subsequently controls the playback circuits unit 120 so as to play back the video data in the order in which it was recorded (that is, in the order of display of the thumbnail images in the index display screen 201).

The playback circuits unit 120 reads the scene corresponding to the thumbnail image from the HDD 130 or the DVD media 131a via the recording/playback unit 105. Then, the playback circuits unit 120 decodes the image data and the audio data in the read-out video data and outputs the decoded image data and audio data from the video output terminal 108 and the audio output terminal 109, respectively, and at the same time displays the played back video on the display unit 107.

Specifically, in the playback circuits unit 120, when a playback command is transmitted from the system control unit 104 to the playback analyzer 126, the playback analyzer 126 analyzes moving image information for playback.

The data read from the HDD 130 or the DVD media 131a by the recording/playback unit 105 is supplied to the data decoding processor 125 via the playback analyzer 126. The data decoding processor 125 detects image data and audio data from the read-out data, and further, detects metadata from the file header and footer. Then, the data decoding processor 125 outputs the image data to the image data decoder 123 and outputs the audio data to the audio data decoder 124.

The image data decoder 123 decodes the image data output from the data decoding processor 125 and outputs the decoded image data to the image output unit 121. The image output unit 121 converts the decoded image data to a format suitable for processing by an external monitor or by another external device, and outputs the formatted decoded image data to at least one of the video output terminal 108 or the display unit 107.

The audio data decoder 124 decodes the audio data output from the data decoding processor 125 and outputs the decoded audio data to the audio output unit 122. The audio output unit 122 converts the decoded image data to a format suitable for processing by an external device and outputs the formatted decoded audio data to the audio output terminal 109.

Figure 3:
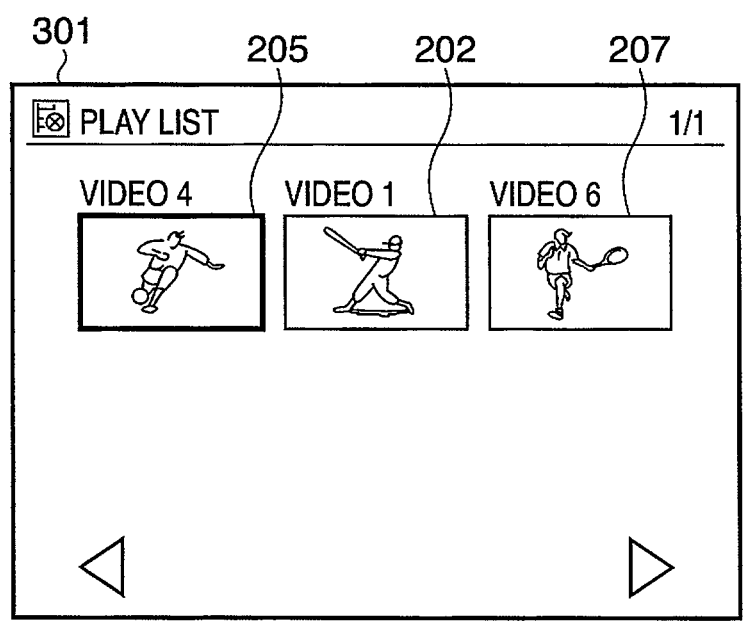
FIG. 3 is a diagram showing an example of an index display screen that the digital video camera according to embodiments of the present invention displays in a play list playback mode.

FIG. 3 is a diagram showing an example of an index display screen displayed in the play list playback mode. In FIG. 3, contents of a pre-formed play list are displayed as a list of thumbnail images.

By manipulating the operating unit 103 at any time in the playback mode, the user can generate or edit a play list.

Specifically, when generation of a play list is instructed by the operating unit 103, the system control unit 104 selects one of either the HDD 130 or the DVD drive 131, and displays an index screen of the scenes recorded on the selected recording media. The user selects and specifies from the displayed index screen the thumbnail images for the scenes that he or she wishes to play back in the order in which he or she wishes to play them back, to specify the playback order. Subsequently, when the user decides on play list generation, the management information processing unit 140 generates a play list that describes the procedure for playing back image data of the scenes in the specified order. The play list thus generated is then formed to a predetermined format by the recording/playback unit 105, and then recorded as play list information on the HDD 130 or the DVD drive 131. In the example shown in FIG. 3, scenes corresponding to thumbnail images 205, 202, and 207 shown in FIG. 2 are shown to be specified to be played back in order from the left.

FIG. 4 is a diagram showing an example external view of the digital video camera 100 according to embodiments of the present invention, in which constituent elements that are the same as those shown in FIG. 1 are given the same reference numerals.

In FIG. 4, 131a denotes DVD media that can be installed in and removed from the DVD drive 131 by an installation/removal mechanism, not shown. In addition, 103a denotes one switch contained in the operating unit 103, a mode dial for switching between power ON/OFF, recording mode, and playback mode.

(Dubbing Process Operation)

Using the flow chart shown in FIG. 5, a description is now given of a dubbing process operation in the digital video camera of the present embodiment having the configuration described above. It is to be noted that, in the present specification, "dubbing" means copying or moving video data recorded on one of a plurality of recording media to another recording medium.

It is to be noted that, here, as one example of the dubbing process operation, a description is given of an operation in a case of dubbing video data recorded on the HDD 130 onto DVD media 131a installed in the DVD drive 131.

In the digital video camera of the present embodiment there is a dubbing mode as an operating mode, and operation in the dubbing mode starts when the dubbing mode is selected with a mode selection dial or the like included in the operating unit 103.

When operation in the dubbing mode starts, the system control unit 104 confirms whether or not a dubbing list has already been created, for example by checking the HDD 130 via the recording/playback unit 105 (S401). Then, if there is no dubbing list that has already been created, the system control unit 104 carries out a dubbing list creation process using the management information processing unit 140 (S402).

Figure 6A:
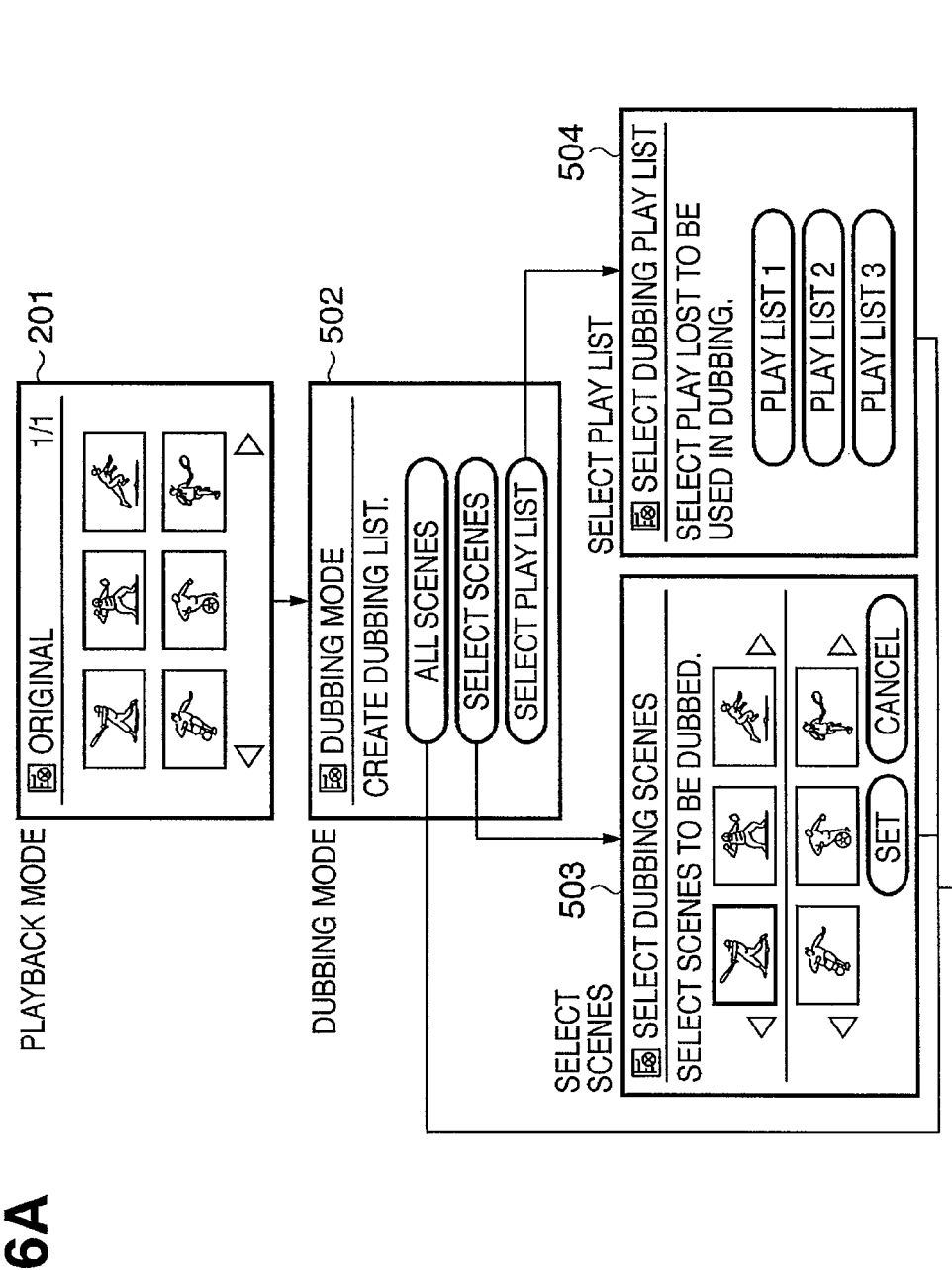

A description is now given of a process of creating a dubbing list, with reference to FIGS. 6A and 6B.

First, the management information processing unit 140 displays a dubbing list creation starting screen 502 (FIG. 6A) on the display unit 107. The creation starting screen 502 is a screen for selecting a dubbing list creation method. In the present embodiment, the user can select one of three creation methods that register in the dubbing list either (1) all scenes, (2) scenes selected by the user, or (3) scenes registered in a play list.

When (1) "all scenes" is selected, the management information processing unit 140 registers all scenes in the dubbing list and displays a dubbing process contents confirmation screen 505 (FIG. 6B) on the display unit 107. The confirmation screen 505 provides the user with information relating to the dubbing process, such as thumbnails of the scenes registered in the dubbing list (information expressing dubbing process contents), expected processing time for the dubbing process, the number of recording media required for the dubbing process, and so forth. In addition, the user cam also set the recording rate in the confirmation screen 505.

When (2) "select scenes" is selected, the management information processing unit 140 displays a scene selection screen 503 (FIG. 6A) on the display unit 107.

The scene selection screen 503 is divided into two stages, upper and lower, with a list of thumbnails of selectable scenes shown in the upper stage. In the example shown in FIGS. 6A and 6B, because all the thumbnails cannot be displayed on a single screen, the thumbnails are shown displayed in a state in which they are scrolled horizontally.

Once the thumbnail images displayed in the upper stage are selected as images to be dubbed, the management information processing unit 140 registers the scenes corresponding to the selected thumbnail images in the dubbing list. The selected thumbnail images are then displayed in the order of selection in the lower stage, starting from the left. Therefore, in the example shown in FIG. 5, two scenes are shown as selected for dubbing. When a "set" button in the scene selection screen is manipulated and the setting of the selection is reported to the management information processing unit 140, the management information processing unit 140 registers the selected scenes in the dubbing list. The management information processing unit 140 then displays the confirmation screen 505 on the display unit 107.

When (3) "select play list" is selected, the management information processing unit 140 displays a play list selection screen 504 (FIG. 6A) on the display unit 107.

The play list selection screen 504 displays a list of play lists that have been created as of that time. In the example shown in FIG. 6, three play lists have been created. The user selects a desired one from the play lists displayed as a list and notifies the management information processing unit 140. The management information processing unit 140 registers the scenes registered in the reported play list in the dubbing list. The management information processing unit 140 then displays the confirmation screen 505 (FIG. 6B) on the display unit 107.

Once a dubbing list is created in the manner described above, the management information processing unit 140 carries out dubbing process setting (S403).

As described above, in the confirmation screen 505, the user can set the recording rate, confirm the number of discs required and the expected processing time for dubbing, and so forth. When an "NG" button in the confirmation screen 505 is manipulated, the management information processing unit 140 once again displays the creation starting screen 502 and does the dubbing list creation process over again. By contrast, when an "OK" button in the confirmation screen 505 is manipulated, the management information processing unit 140 displays a dialog screen 506 (FIG. 6B) for carrying out final confirmation. When a "cancel" button in the dialog screen is manipulated, the management information processing unit 140 deletes the dialog screen. By contrast, when the "OK" button is manipulated, the management information processing unit 140 confirms the contents of the dubbing process according to the setting contents at that time and starts the dubbing process (S404).

The system control unit 104, in accordance with the dubbing list generated by the management information processing unit 140, reads in video data from the HDD 130 via the recording/playback unit 105 (S405) and supplies the video data to the playback circuits unit 120. At the playback circuits unit 120 the video data thus supplied is subjected to a decoding process (S406). Then, the decoding results are output from the image output unit 121 and the audio output unit 122 to the image signal processor 111 and the audio signal processor 112 in order to put them into a recording format suitable for the DVD media 131a.

At the recording circuits unit 110, the decoded images and audio are once again encoded (re-encoded) for recording on the DVD media 131a (S407). The re-encoded image and audio signals are then recorded on the DVD media 131a installed in the DVD drive 131 in a predetermined format by the recording/playback unit 105 (S408).

It is to be noted that, in a case in which data is simply copied without converting the video data format by re-encoding, the video data read in from the HDD 130 via the recording/playback unit 105 may be transferred to the DVD drive 131 without being sent to the playback circuits unit 120. In this case, the processes of S406 and S407 are not carried out.

The system control unit 104 displays on the display unit 107 a progress screen 507 (FIG. 6B) for notifying the user of the progress of the process during the dubbing process. An interrupt button is included in the progress screen 507 to enable the user to instruct that the dubbing process be interrupted.

In addition, the system control unit 104 confirms, every predetermined unit of time or every predetermined unit of recording, if recording of the moving images registered in the dubbing list is finished, and, if the dubbing process is finished, ends the dubbing mode (S409). In the event that the dubbing process is not finished, the system control unit 104 confirms if a request to interrupt dubbing (a dubbing interruption request) has been issued (S410).

Although there are no particular limitations on the factors causing a dubbing interruption request to be issued, in the present embodiment it is assumed that there is a request to execute a priority process of higher priority than the dubbing process. Specifically, for example, the cause of the dubbing interruption request may be a switch to the recording mode by manipulation of the mode dial 103a during a dubbing process (that is, a request to shift to the recording mode). Alternatively, the cause may be a request to record video data. Other examples besides these can be given as causes of a dubbing interruption request, such as, in a case in which dubbing has been paused due to an instruction to interrupt from the user or due to dropping or shaking of the camera, during battery drive time the battery remaining capacity decreases and the dubbing process can no longer be continued.

Figure 8:
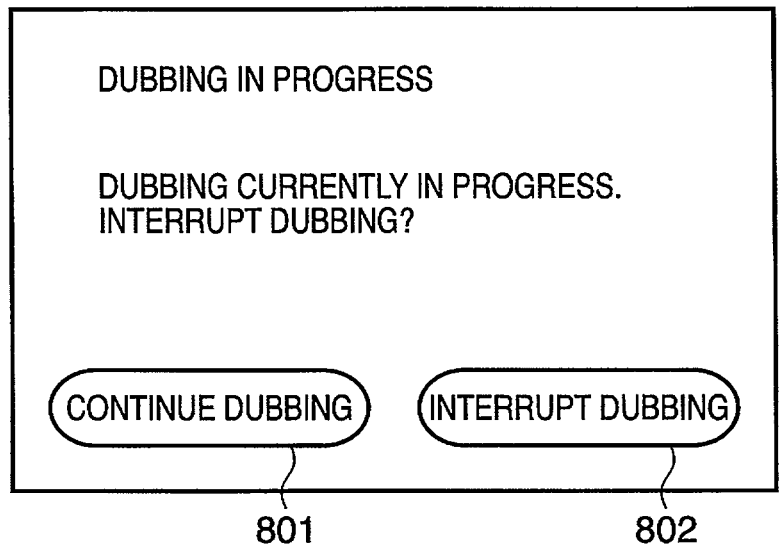
FIG. 8 is a diagram showing an example of a dubbing interruption confirmation screen that the digital video camera according to embodiments of the present invention displays.

In a case in which a dubbing interruption request has been issued, the system control unit 104 displays a confirmation screen for confirming whether or not to interrupt (stop) the dubbing process on the display unit 107. An example of the confirmation screen is shown in FIG. 8.

When the user manipulates a "continue dubbing" button 801 in the confirmation screen, the system control unit 104 returns processing to S405 and continues the dubbing process. By contrast, when the user manipulates an "interrupt dubbing" button 802 in the confirmation screen, the system control unit 104 carries out a dubbing interruption process (S411). It is to be noted that, depending the cause of the issuance of the dubbing interruption request, the dubbing process may be interrupted immediately, without displaying the confirmation screen to confirm the interruption of the dubbing process. For example, in a case in which a manipulation to switch to the recording mode has been carried out, the dubbing process can be interrupted immediately so as not to miss an image sensing opportunity.

Figure 7:
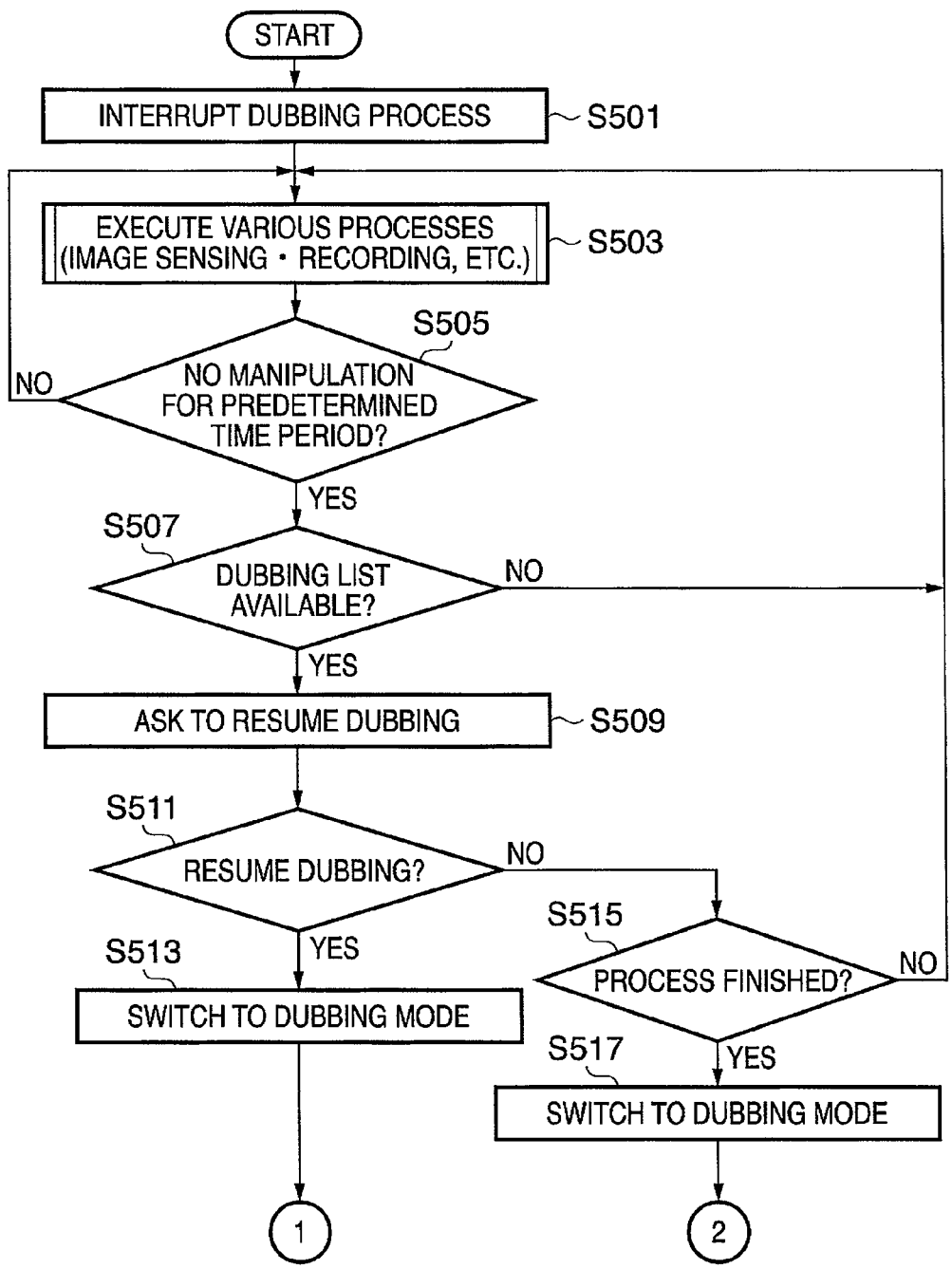
FIG. 7 is a flow chart illustrating operation of a dubbing interruption process in the digital video camera according to embodiments of the present invention.

FIG. 7 is a flow chart illustrating an example of the dubbing interruption process in the present embodiment.

First, the system control unit 104 interrupts the dubbing process (S501). Then, the management information processing unit 140 stores information necessary to resume the dubbing process (interrupted dubbing information) in the memory 106, for example. There are no particular restrictions on the content of the interrupted dubbing information. Thus, for example, the interrupted dubbing information may be dubbing process setting information for the dubbing list or the recording rate, information indicating up to where the dubbing process has been carried out (that is, where the dubbing process was interrupted), information identifying the DVD media 131a that is the recording destination (such as a disk ID), and the like. There are no particular restrictions on the information indicating the dubbing process interruption location, and thus, for example, an amount of data recorded onto the DVD media 131a may be calculated as a number of minimum recording units (clusters) since the start of the dubbing process, and at interruption this calculated value may be used as information indicating the location of interruption. Up to where on the DVD media 131a has data been recorded can then be identified from the amount of data per cluster and the calculated value.

Subsequently, the system control unit 104 executes a priority process of higher priority than the dubbing process that is the cause of the issuance of the dubbing interruption request (S503). For example, in a case in which the dubbing process is interrupted by an instruction to switch to the recording mode, the digital video camera is put into a standby state, for example, the display unit 107 is made to function as an electronic viewfinder.

Figure 9:
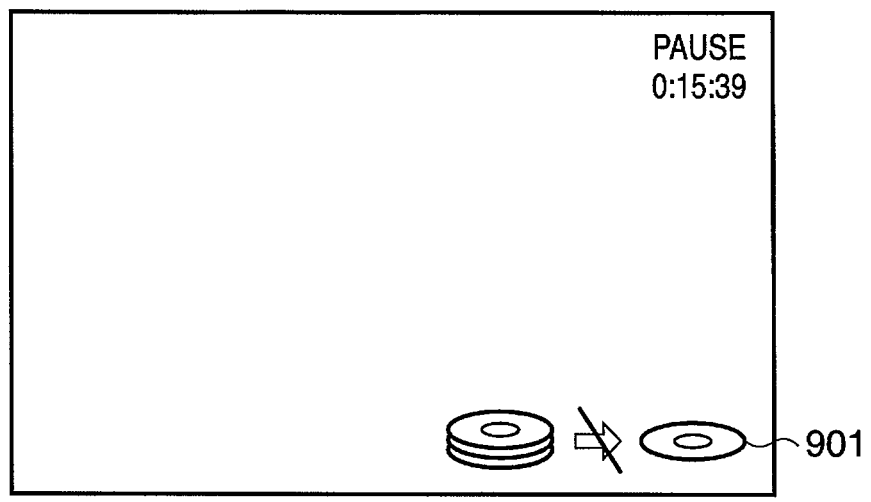
FIG. 9 is a diagram showing an example of a display that the digital video camera according to embodiments of the present invention carries out in order to show interruption of the dubbing process when the digital video camera interrupts the dubbing process and shifts to a recording mode.

The above-described arrangement enables the user to carry out new image sensing and recording even during a dubbing process. Thereafter, the system control unit 104 carries out the recording process described above in response to user manipulation. It is to be noted that, when interrupting the dubbing process and shifting to the recording mode, as shown in FIG. 9, a mark 901 or the like indicating that the dubbing process has been interrupted can also be displayed on the display unit 107 that functions as an electronic viewfinder.

The system control unit 104 monitors the operating unit 103 while executing the process and checks whether or not a state in which there is no manipulation by the user has continued for a predetermined time period (as one example, 5 minutes). For example, after the recording process is finished, or when a state continues in which, without carrying out the recording process, no user manipulation is carried out for a predetermined time period, the system control unit 104 confirms whether or not a dubbing list exists (S507).

If there is no interrupted dubbing information, specifically no dubbing list (in other words, if the dubbing process has not been interrupted), the system control unit 104 returns processing to S503. By contrast, in the event that there is a dubbing list, the system control unit 104 displays a query screen on the display unit 107 asking the user whether or not to resume the dubbing process (S509). An example of the query screen is shown in FIG. 10. When a "Do Not Resume" button 602 in the query screen is manipulated (N at S511), the system control unit 104 confirms with the user whether or not to end processing, and if there is an instruction to not end, returns processing to S503. By contrast, if there is an instruction to end, the system control unit 104 switches the operating mode of the digital video camera to the dubbing mode (S517), ends the dubbing interruption process, and advances processing to S417 (FIG. 5).

When a "Resume Dubbing" button 601 in the query screen is manipulated (Y at S511), the system control unit 104 switches the operating mode of the digital video camera to the dubbing mode (S513), then ends the dubbing interruption process and advances processing to S413 (FIG. 5). Thus does the system control unit 104 cause the dubbing process to be resumed when instructed to resume the database via the query screen.

To return to the description of the dubbing mode operation shown in FIG. 5.

When a dubbing list exists at S401, the system control unit 104, as in S509, asks the user whether or not to resume the interrupted dubbing process. At this point, when there is an instruction to resume, the system control unit 104 reads the interrupted dubbing information from the memory 106.

The system control unit 104, from the interrupted dubbing information, compares the disk ID of the DVD media 131a inserted in the DVD drive 131 and the disk ID of the DVD media that was the recording destination when the dubbing process was interrupted (S414).

Then, if both disk IDs match, the system control unit 104 resumes the dubbing process according to the interrupted dubbing information (S415), and continues to record to the DVD media 131a from the dubbing interruption location (S405). By contrast, if the disk IDs do not match, the system control unit 104 displays an error message prompting insertion of the DVD media 131a used in the interrupted dubbing process on the display unit 107 (S416).

If in S412 the user carries out an instruction to the effect that the dubbing process is not to be resumed, the system control unit 104 displays a query screen asking whether or not to discard the dubbing list on the display unit 107 (S417).

Subsequently, when there is an instruction to discard the dubbing list, the system control unit 104 deletes the dubbing list (S418). At this time, the interrupted dubbing information is also deleted. It is to be noted that, when the dubbing list is deleted, in a case in which the recording medium (the DVD media) used in the interrupted dubbing process is a random access type medium, the user may be notified by a message display or the like that the recorded portion cannot be used. Similarly, in a case in which a rewritable medium has been used, a message display may be carried out prompting reformatting of the recording medium.

It is to be noted that, in the present embodiment, a description is given of a configuration in which the user is asked whether or not an interrupted dubbing process is to be resumed in a case in which there is no manipulation for a predetermined time period or in a case in which a dubbing list exists when the shift is made to the dubbing mode. However, the user may be asked whenever a manipulation is carried out to shift from the recording mode to the playback mode or some other operating mode. In addition, the video record/playback apparatus may be configured so that the user is asked whenever the DVD media 131a that is the recording destination recording medium is removed from the DVD drive 131 and later once again installed therein. In this case, the query may be carried out on the condition that the media ID in the interrupted dubbing information and the installed media ID match.

Thus, as described above, according to the present embodiment it is possible to interrupt a dubbing process for the sake of another process even during the dubbing process, and moreover, the interrupted dubbing process can be easily resumed.

In addition, by interrupting the dubbing process by switching to the recording mode, for example, and shifting to a state in which recording is enabled, it is possible to carry out recording without missing an image sensing opportunity even during the dubbing process. Also, because the user is asked whether or not to resume the dubbing process after the recording process or when operating in the next dubbing mode, the user can with certainty resume the interrupted dubbing process.

Second Embodiment

A description is now given of a second embodiment of the present invention.

A video record/playback apparatus according to the second embodiment prohibits deletion and editing (splitting and joining) of video data corresponding to scenes registered in the dubbing list during dubbing interruption.

This is because, if the user deletes or edits (splits or joins) video data including scenes registered in the dubbing list in a state in which the dubbing process has been interrupted, the dubbing process cannot be resumed on the basis of the dubbing list.

Figure 11:
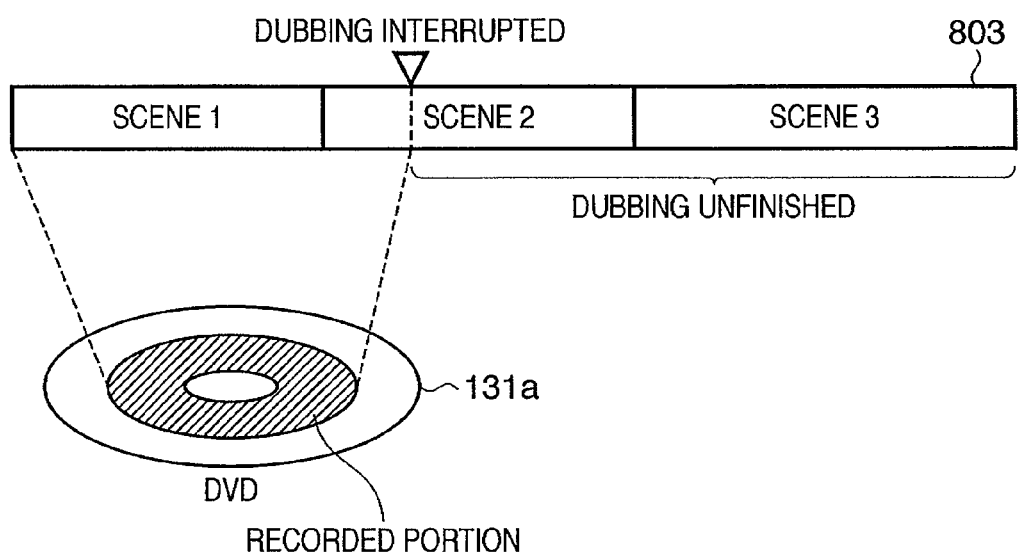
FIG. 11 is a diagram showing schematically a dubbing list and a state of a recording medium during dubbing interruption in the digital video camera according to embodiments of the present invention.

FIG. 11 is a diagram showing schematically a dubbing list and a state of a recording medium during dubbing interruption.

Scene 1, scene 2, and scene 3 are registered in a dubbing list 803, with the dubbing process interrupted in the middle of scene 2. It is to be noted that, in FIG. 11, the contents of the dubbing list 803 are shown schematically to facilitate easy identification of the location of interruption of the dubbing process. In FIG. 11, at the time the dubbing process was interrupted, of the three scenes 1 through 3 on the DVD media 131a, the dubbing process was finished only for scene 1; for scene 2 and scene 3, the dubbing process remains unfinished.

In this state, if the video data corresponding to scene 2 and scene 3 is deleted or edited (spit or joined), the contents of the dubbing list 803 and the video data will no longer be consistent with each other, which renders resumption of the dubbing process on the basis of the interrupted dubbing information impossible. Therefore, the present embodiment prohibits deleting or editing the video data corresponding to scene 2 and scene 3, for which the dubbing process is unfinished, until either the dubbing process is finished or abandonment of the dubbing process is verified.

It is to be noted that, of the scenes registered in the dubbing list here, deletion and editing of only that video data corresponding to those scenes for which the dubbing process is unfinished is prohibited. However, deletion and editing may be prohibited for video data corresponding to all the scenes registered in the dubbing list.

Specifically, first, at the start of the dubbing process (S404 in FIG. 5), the system control unit 104 provides an attribute that prohibits deletion and editing (protection attribute) of video data corresponding to scenes registered in the dubbing list.

Subsequently, the system control unit 104, during the dubbing process, releases the protection attribute for video data corresponding scenes for which the dubbing process is finished (provided that the dubbing process for other scenes constituting the same video data is not unfinished). Alternatively, as described above, the protection attribute may be released for all video data after all dubbing processes are finished.

In addition, the protection attribute may be provided when the dubbing process is interrupted, without providing or releasing the protection attribute at the start of the dubbing process or during the dubbing process. In this case also, the protection attribute may be provided for only that video data which corresponds to those scenes for which the dubbing process is not finished, or the protection attribute may be provided for video data corresponding to all scenes registered in the dubbing list. Release of the protection attribute may be carried out either in units of scenes depending on the progress of the resumed dubbing process, or carried out all at once when all dubbing processes are finished.

Here, whether or not the video record/playback apparatus is in a state in which the dubbing process has been interrupted, and whether or not the video data dubbing process is unfinished, can be determined on the basis of the interrupted dubbing information that the management information processing unit 140 generates at dubbing interruption.

The deletion and editing that is prohibited in the present embodiment is deletion and editing of the video data itself. Deletion and editing of management information that does not affect the video data itself, such as the play list described above, need not be prohibited.

Figure 12:
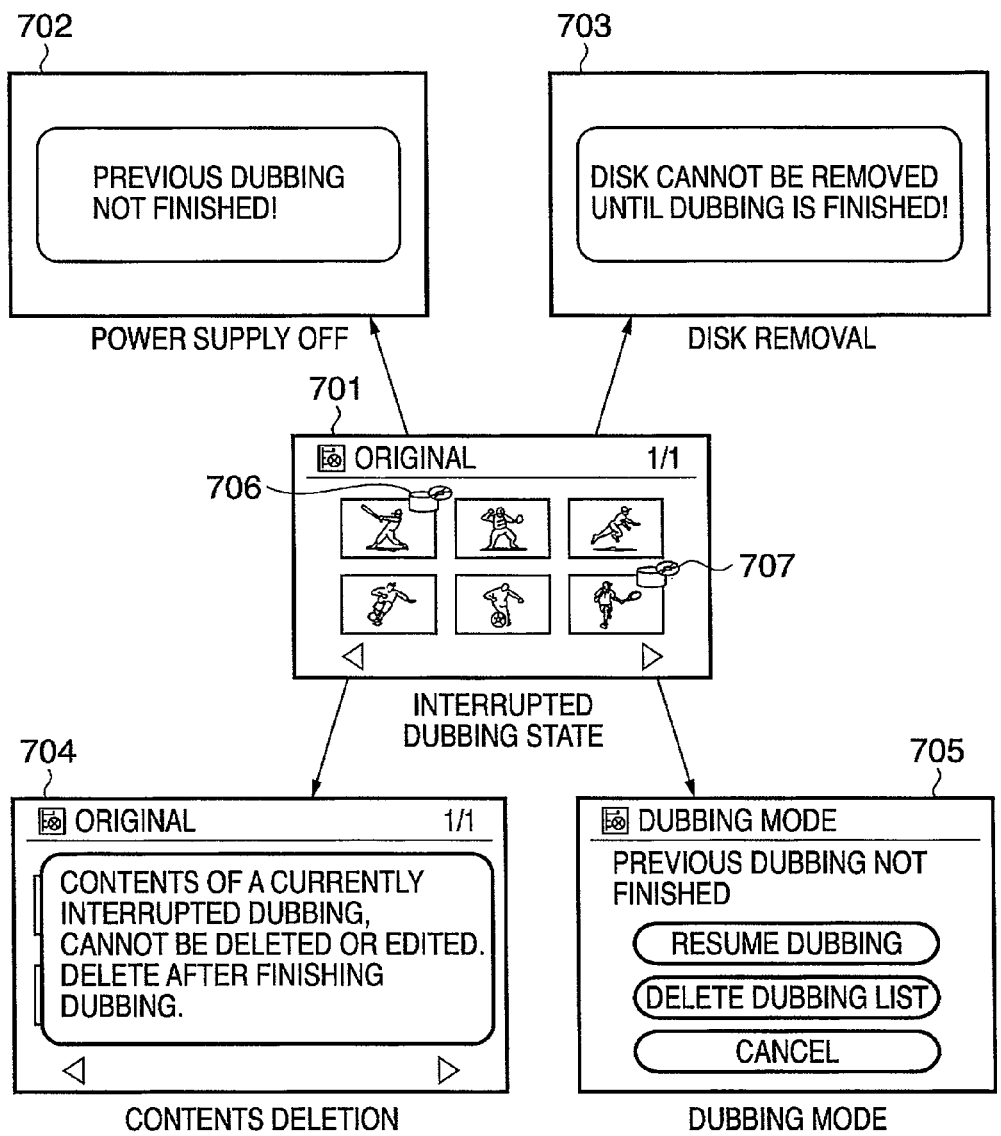
FIG. 12 is a diagram showing examples of screens that the digital video camera according to embodiments of the present invention displays in an original playback mode in a dubbing interruption state and examples of screens that the digital video camera according to embodiments of the present invention displays in response to user manipulation.

FIG. 12 is a diagram showing examples of screens that the digital video camera according to the present embodiment displays in an original playback mode in a dubbing interruption state and examples of screens that the digital video camera displays in response to user manipulation.

When the operating mode is the original playback mode, the system control unit 104 checks the interrupted dubbing information and informs the user when dubbing is being interrupted. In the present embodiment, in a list display screen of thumbnail images displayed in the original playback mode, a display is carried out indicating that dubbing is being interrupted on thumbnail images corresponding to scenes registered in the dubbing list.

As shown in FIG. 12, in a list display screen 701, dubbing interruption marks 706, 707 indicating that the dubbing process has been interrupted are provided for thumbnail images corresponding to scenes registered in the dubbing list of the interrupted dubbing process. In addition, as with provision of the protection attribute described above, the dubbing interruption marks 706, 707 may be provided for all the thumbnail images targeting all the scenes registered in the dubbing list, or they may be provided only for those thumbnail images of those scenes for which the dubbing process is unfinished.

Here, the user has manipulated the operating unit 103, selected thumbnail images to which the dubbing interruption mark has been added, and instructed that these be deleted. In this case, the system control unit 104 displays on the display unit 107 a screen 704 notifying the user that these scenes that the user is attempting to delete cannot be deleted because they are being used in a dubbing process that is currently being interrupted.

In addition, in a case in which the user has changed the operating mode of the digital video camera to the dubbing mode, as described above the system control unit 104 displays a query screen 705 on the display unit 107. It is to be noted that the query screen 705 shown in FIG. 12 combines the query screen for asking the user whether or not a dubbing process is to be resumed that is displayed in S412 shown in FIG. 5 and a query screen for asking the user whether or not to delete a dubbing list that is displayed in S417.

In the query screen 705, when dubbing process resumption is instructed, the system control unit 104 resumes the dubbing process as described above (FIG. 5, S413 and following steps). When deletion of the dubbing list is instructed, the system control unit 104 deletes the dubbing list (S418), aborts display of the dubbing interruption marks 706, 707, and releases the protection attribute that had been set. As described above, when the dubbing list is deleted, a message suitable to the recording system of the DVD media may be displayed.

In the event that the power supply for the digital video camera is turned OFF during display of the list display screen 701, the system control unit 104 displays on the display unit 107 for several seconds a notification screen indicating to the user that there is an unfinished dubbing process, after which the system control unit 104 turns the power supply OFF. When a dubbing list remains when the power supply is turned ON, the same notification screen is displayed for several seconds, after which a start-up screen may be displayed.

In the event that the DVD media 131a used for the interrupted dubbing process is installed in the DVD drive 131, removal of the DVD media 131a may be prohibited. In this case, if an attempt to remove the DVD media 131a used for the interrupted dubbing process is made while the list display screen 701 is being displayed, the system control unit 104 displays on the display unit 107 a warning screen 703 indicating that removal of the media is prohibited. It is to be noted that the prohibition on removal of media may be released when the dubbing list is deleted.

It is to be noted that, in a case in which the user wishes to delete or edit video data in the full awareness that such video data corresponds to scenes for which the dubbing process is unfinished, the video record/playback apparatus may be configured to allow the user to do so. In this case, in the screen 704 the user may be asked whether or not he or she wishes to delete or edit in full awareness that the dubbing process will be unable to be resumed, and if there is an instruction indicating such a desire, the deletion or editing may be allowed. In the event that deletion or editing is allowed, either the dubbing list is deleted, rendering resumption of the dubbing process impossible, or those scenes according to the video data that has been deleted or edited are removed from the dubbing list.

Thus, as described above, according to the present embodiment, in the event that a dubbing process is interrupted, deletion or editing of video data corresponding to all scenes registered in the dubbing list or to scenes for which the dubbing process is unfinished is prohibited. As a result, unintended deletion or editing by the user of video data for which the dubbing process is unfinished and rendering resumption (completion) of the dubbing process impossible can be prevented. In addition, the user is made aware of the fact that the video record/playback apparatus is in a state in which the dubbing process has been interrupted, and prompted to resume the dubbing process.

Other Embodiments

Although in the foregoing embodiments a description is given only of a dubbing process of dubbing from a HDD to DVD media, the present invention is independent of the recording medium of the dubbing source and the dubbing destination and therefore is of course applicable to a dubbing process of dubbing from DVD media to a HDD. It is to be noted that the recording medium may be not only the semiconductor memory cards and optical disks currently used but also anything that conforms to future standards.

Moreover, although in the foregoing embodiments a description is given of a digital video camera having the recording medium of both the dubbing source and the dubbing destination built in, either one of the recording medium may be externally connected. For example, the present invention is also applicable to a dubbing process of dubbing to DVD media installed in an externally connected DVD drive, in a case in which the digital video camera has a built-in HDD.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-113162, filed on Apr. 23, 2007, which is hereby incorporated by reference herein in its entirety.

What is claimed is:

1. An image processing apparatus comprising:
a central processing unit (CPU), the CPU is coupled to a memory for executing instructions to implement
a reproducing unit that reproduces moving image data from a first recording medium;
a recording unit that records moving image data into a second recording medium;
a selection unit that selects, from among moving image data recorded in the first recording medium, a plurality of moving image data to be recorded into the second recording medium in a dubbing process;
a controller that performs the dubbing process by controlling the reproducing unit to reproduce from the first recording medium the plurality of selected moving image data to be recorded into the second recording medium and controlling the recording unit to record the plurality of selected moving image data reproduced by the reproducing unit into the second recording medium;
a management information processing unit that generates, in accordance with an interruption of the dubbing process being performed, management information for discriminating a moving image data, which has not been recorded into the second recording medium among the plurality of selected moving image data to be recorded into the second recording medium in the dubbing process; and
an instruction receiving unit that receives, after the interruption of the dubbing process, a deletion instruction to delete the moving image data from the first recording medium,
wherein the controller determines, in accordance with the management information, whether to delete from the first recording medium the moving image data video file instructed to be deleted by the deletion instruction received by the instruction receiving unit after the interruption of the dubbing process such that the moving image data, which has not been recorded into the second recording medium among the plurality of selected moving image data to be recorded into the second recording medium in the dubbing process, is prohibited from being deleted from the first recording medium.

2. The image processing apparatus according to claim 1, wherein the controller determines that the moving image data, which is instructed to be deleted by the deletion instruction, is to be deleted if the moving image data is one of the plurality of selected moving image data and has been completely recorded into the second recording medium in the dubbing process, and then deletes the moving image data instructed to be deleted by the deletion instruction from the first recording medium.

3. The image processing apparatus according to claim 1, further comprising a display that displays images corresponding to the moving image data recorded in the first recording medium, and
wherein the display displays, after the interruption of the dubbing process, thumbnail images corresponding to the moving image data recorded in the first recording medium and a predetermined image indicating the moving image data, which has not been recorded into the second recording medium among the plurality of selected moving image data to be recorded into the second recording medium in the dubbing process in accordance with the management information.

4. The image processing apparatus according to claim 1, wherein the second recording medium is a removable from the image processing apparatus, and
wherein the controller prohibits the removal of the second recording medium during the dubbing process is interrupted.

5. The image processing apparatus according to claim 4, wherein the controller displays a warning screen on a display unit, if an attempt to remove the second recording medium is made.

6. The image processing apparatus according to claim 1, wherein upon interruption of the dubbing process being performed, the controller generates information indicating the amount of data that have been recorded in the second recording medium.

7. The image processing apparatus according to claim 1, wherein the controller interrupts the dubbing process being performed in response to a to record moving image data to any one of the first and second recording medium.

8. The image processing apparatus according to claim 1, wherein if there has been no manipulation by a user for a predetermined time period since the dubbing process was interrupted, the controller displays an inquiry screen for asking the user whether or not to resume the interrupted dubbing process, on a display unit.

9. The image processing apparatus according to claim 8, wherein if an instruction to resume the interrupted dubbing process is input, the controller resumes the interrupted dubbing process in accordance with the management information.

10. An image processing method comprising:
- a reproducing step that reproduces moving image data from a first recording medium:
- a recording step that records moving image data into a second recording medium;
- a selecting step that selects, from among moving image data recorded in the first recording medium, a plurality of moving image data to be recorded into the second recording medium in a dubbing process;
- a dubbing step that performs the dubbing process by controlling the reproducing step to reproduce from the first recording medium the plurality of selected moving image data to be recorded into the second recording medium and controlling the recording unit to record the plurality of selected moving image data reproduced by the reproducing unit into the second recording medium;
- a generating step that generates, in accordance with an interruption of the dubbing process being performed, management information for discriminating a moving image data, which has not been recorded into the second recording medium among the plurality of selected moving image data to be recorded into the second recording medium in the dubbing process;
- an instruction receiving step that receives, after the interruption of the dubbing process, a deletion instruction to delete the moving image data from the first recording medium; and
- a determining step that determines, in accordance with the management information, whether to delete from the first recording medium the moving image data a instructed to be deleted by the deletion instruction received in the instruction receiving step after the interruption of the dubbing process such that the moving image data, which has not been recorded into the second recording medium among the plurality of selected moving image data to be recorded into the second recording medium in the dubbing process, is prohibited from being deleted from the first recording medium.

11. The image processing method according to claim 10, further comprising a display step that displays images corresponding to the moving image data recorded in the first recording medium, and
- wherein the display step displays, after the interruption of the dubbing process, thumbnail images corresponding to the moving image data recorded in the first recording medium and a predetermined image indicating the moving image data, which has not been recorded into the second recording medium among the plurality of selected moving image data to be recorded into the second recording medium in the dubbing process, in accordance with the management information.

* * * * *